(12) United States Patent
Johnson

(10) Patent No.: US 8,687,277 B2
(45) Date of Patent: Apr. 1, 2014

(54) STACKED-GRATING LIGHT MODULATOR

(76) Inventor: Kenneth C. Johnson, Santa Clara, CA (US)

(*) Notice: Subject to any disclaimer, the term of this patent is extended or adjusted under 35 U.S.C. 154(b) by 0 days.

(21) Appl. No.: 13/198,512

(22) Filed: Aug. 4, 2011

(65) Prior Publication Data

US 2012/0200909 A1   Aug. 9, 2012

Related U.S. Application Data

(60) Provisional application No. 61/372,791, filed on Aug. 11, 2010.

(51) Int. Cl.
*G02B 27/44* (2006.01)
*G02B 5/18* (2006.01)
*G11B 7/1353* (2012.01)

(52) U.S. Cl.
CPC .................................. *G11B 7/1353* (2013.01)
USPC .............................. 359/566; 359/572; 359/573

(58) Field of Classification Search
USPC .......... 359/240, 291, 558, 556, 566, 572, 573
See application file for complete search history.

(56) References Cited

U.S. PATENT DOCUMENTS

| 5,483,377 A * | 1/1996 | Kaneda et al. ................. 359/566 |
| 7,102,759 B2 * | 9/2006 | Yamamoto .................... 356/499 |
| 2009/0001260 A1 * | 1/2009 | Klaver et al. .............. 250/237 G |

* cited by examiner

*Primary Examiner* — William Choi
(74) *Attorney, Agent, or Firm* — Kilpatrick Townsend & Stockton LLP

(57) ABSTRACT

A "Stacked-Grating Light Modulator" ("SGLM") comprises two diffraction grating elements, a reflection grating and a transmission grating, in close parallel proximity. An incident beam transmits through the transmission grating and is reflected by the reflection grating back through the transmission grating. The relative lateral position of the two gratings is varied to modulate the beam's zero-order reflectance.

8 Claims, 18 Drawing Sheets

| $\lambda$ | 0.4 micron |
|---|---|
| $nR$ | 0.49+4.86$i$ (Al) |
| $nT$ | 1.558 (SiO2) |
| $d$ | 8.0 micron |
| $aR$ | 0.5619 |
| $aT$ | 0.3187 |
| $hR$ | 0.0580 micron |
| $hT$ | 0.0922 micron |
| $hGap$ | 0.0476 micron |

| $\lambda$ | 0.4 micron |
|---|---|
| $nR$ | 0.49+4.86$i$ (Al) |
| $nT$ | 1.558 (SiO2) |
| $d$ | 1.0 micron |
| $aR$ | 0.5034 |
| $aT$ | 0.2700 |
| $hR$ | 0.0521 micron |
| $hT$ | 0.1071 micron |
| $hGap$ | 0.2013 micron |

| | |
|---|---|
| $rF = \dfrac{n' - n}{n' + n}$ | A1 |
| $r' = \dfrac{r + rF}{1 + r \cdot rF}$ | A2 |
| $r' = \exp[i 4\pi n h / \lambda] r$ | A3 |
| $fT1R1[s] + fT2R1[s] + fT1R2[s] + fT2R2[s] = 1$ | A4 |
| $r[s] = fT1R1[s] \cdot rT1R1 + fT2R1[s] \cdot rT2R1$ <br> $\quad + fT1R2[s] \cdot rT1R2 + fT2R2[s] \cdot rT2R2$ | A5 |
| $R[s] = \|r[s]\|^2$ | A6 |
| $\left. \begin{array}{l} fT1R1[0] = \min[aT, aR] \\ fT2R1[0] = \max[aR - aT, 0] \\ fT1R2[0] = \max[aT - aR, 0] \\ fT2R2[0] = 1 - \max[aT, aR] \end{array} \right\}$ | A7 |
| $\left. \begin{array}{l} fT1R1[\tfrac{1}{2}] = \max[aR + aT - 1, 0] \\ fT2R1[\tfrac{1}{2}] = \min[aR, 1 - aT] \\ fT1R2[\tfrac{1}{2}] = \min[aT, 1 - aR] \\ fT2R2[\tfrac{1}{2}] = \max[1 - aR - aT, 0] \end{array} \right\}$ | A8 |
| $r[s+1] = r[s] = r[-s]$ | A9 |
| $r[s] = \begin{cases} r[0], & 0 < s \leq s_{OFF} \\ \dfrac{(s_{ON} - s) r[0] + (s - s_{OFF}) r[\tfrac{1}{2}]}{s_{ON} - s_{OFF}}, & s_{OFF} \leq s \leq s_{ON} \\ r[\tfrac{1}{2}], & s_{ON} \leq s < \tfrac{1}{2} \end{cases}$ | A10 |
| $s_{OFF} = \tfrac{1}{2} \| aR - aT \|$ | A11 |
| $s_{ON} = \tfrac{1}{2}(1 - \| 1 - aR - aT \|)$ | A12 |
| $aR \geq aT \rightarrow$ <br> $\quad fT1R1[0] = aT, \; fT2R1[0] = aR - aT, \; fT1R2[0] = 0, \; fT2R2[0] = 1 - aR$ | A13 |
| $aR \leq aT \rightarrow$ <br> $\quad fT1R1[0] = aR, \; fT2R1[0] = 0, \; fT1R2[0] = aT - aR, \; fT2R2[0] = 1 - aT$ | A14 |

FIG. 21

STACKED-GRATING LIGHT MODULATOR

CROSS-REFERENCE TO RELATED APPLICATION

This application claims priority from U.S. Provisional Patent Application No. 61/372,791, filed Aug. 11, 2010, the entire disclosure of which is hereby incorporated by reference for all purposes.

BACKGROUND OF THE INVENTION

Spatial light modulators (SLM's) such as the Digital Micromirror Device (DMD, U.S. Pat. No. 5,061,049) and the Grating Light Valve (GLV, U.S. Pat. No. 5,311,360) are used for applications such as digital displays, digital printing, and maskless lithography. The DMD and GLV both comprise micromechanically actuated mirror elements. The DMD's modulator elements are hinged, tilt-actuated mirrors. The GLV comprises diffraction reflective gratings in the form of interleaved ribbon mirrors, wherein alternate mirrors are translationally displaced to vary the optical phase shift between adjacent mirrors.

An alternative type of micromechanical SLM, which is based on proximate transmission diffraction gratings, is disclosed in U.S. provisional applications 60/116,074 and 60/124,140 (cited in U.S. Pat. No. 6,498,685). In this system, a fixed grating and a movable grating are positioned in close proximity to each other, and zero-order light transmitted through both gratings is modulated by altering the lateral positional relationship between the gratings. (The disclosed system is designed for extreme ultraviolet radiation, but could be adapted for other wavelengths.) An advantage of this type of system is that the modulator elements could be incorporated in a microlens array, eliminating the need for an external spatial modulator and projection optics. Furthermore, the transmission gratings can be controlled to provide very precise and accurate control of the modulated beam intensity. But it would be desirable to employ a similar operational principle with a reflective device, which would allow the modulator's actuator controls and data paths to be placed behind the reflective elements without interfering with the optical light paths.

SUMMARY OF THE INVENTION

A "Stacked-Grating Light Modulator" ("SGLM") operates on a principle similar to that of the previously disclosed transmission modulator, but operating in reflection mode. A transmission grating is disposed in close proximity to a reflection grating, and illuminating radiation is directed through the transmission grating, reflects off of the reflection grating, and again transmits through the transmission grating after reflection. The two gratings operate conjunctively to control the zero-order amplitude of the reflected beam, and their lateral positional relationship is electromechanically controlled to modulate the zero diffraction order between a low-amplitude OFF state and a high-amplitude ON state. The gratings can be configured to provide a high (e.g., 1000:1 or higher) extinction ratio, with minimal sensitivity to tolerance errors in the gap spacing between the gratings and in their lateral alignment in the ON and OFF positions. They can also be actuated to provide precise and continuously-variable gray level control between the ON and OFF states. Illustrative SGLM designs exhibiting these characteristics are detailed in the following disclosure, along with a discussion of general design methodologies.

A further understanding of the nature and advantages of the present invention may be realized by reference to the remaining portions of the specification and the drawings, which are intended to be exemplary and not limiting.

BRIEF DESCRIPTION OF THE DRAWINGS

FIG. 21 tabulates equations relating to the SGLM optical design (these equations are referenced in the Appendix)

DESCRIPTION OF SPECIFIC EMBODIMENTS

1. A Preferred Embodiment

Figure 1:
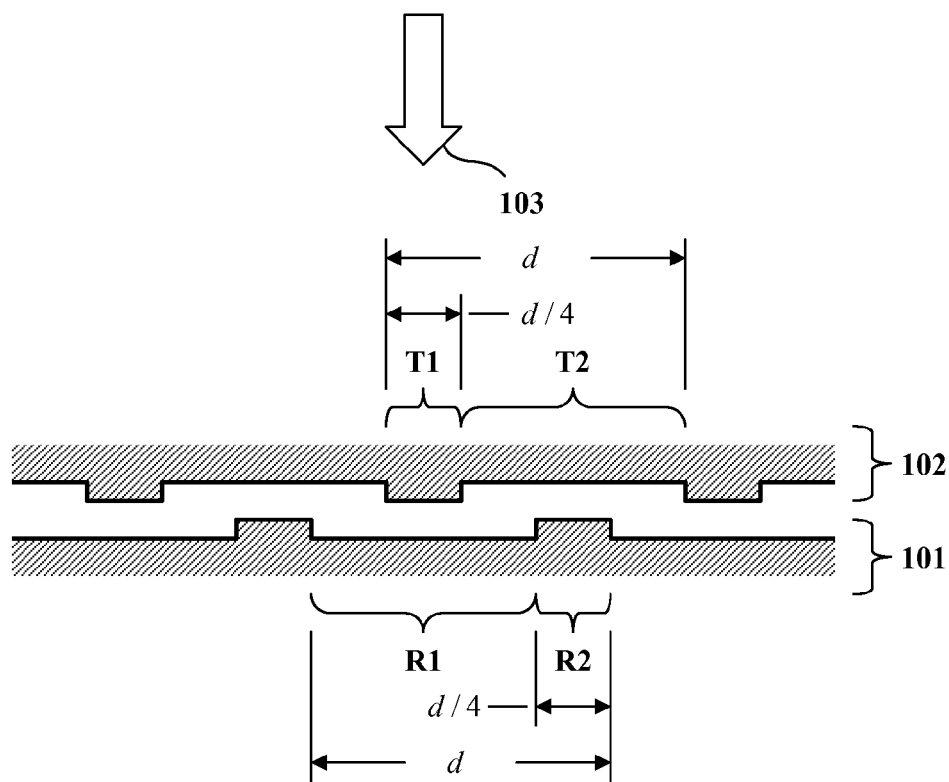
FIGS. 1-3 show cross-sectional views of the SGLM grating elements, with the lower (reflection) grating in different lateral positions.

A simple SGLM embodiment is illustrated in FIG. 1. The device comprises a reflection grating 101 and a transmission grating 102 in close parallel proximity to the reflection grating. Both gratings are lamellar line gratings shown cross-sectionally in the figure. ("Lamellar" means the grating surfaces are all horizontal or vertical, with only two horizontal surface levels. In a lamellar "line" grating the vertical surfaces are all parallel to each other.) The grating period is d and the grating line widths in this embodiment are d/4. For simplicity, we assume that the transmission grating has an ideal anti-reflection (AR) coating, so that it acts as a pure phase shifter. The transmission grating height is selected to induce a single-pass phase shift of $\pi/2$ between portions of a normally-incident, monochromatic beam 103 traversing zone T1 (a grating line), relative to portions of the beam traversing zone T2 (a space). The double-pass phase shift, after reflecting and transmitting back through the transmission grating, is $\pi$. The reflection grating height is similarly selected to induce a phase shift of $-\pi$ in portions of the beam reflected off zone R2 (a line) relative to the portions reflected off the zone R1 (a space).

As a result of the combined effects of the two gratings, the beam reflected back through the transmission grating has a phase shift of $\pi$ above the transmission grating lines, relative to the phase above the overlapped grating space regions; and it has a phase shift of $-\pi$ above the reflection grating lines. A phase shift of $\pm\pi$ has the effect of scaling the electromagnetic field amplitude by a factor of $-1$, so the average reflected field amplitude above the transmission grating is zero, and the zero diffraction order is hence extinguished.

Figure 2:
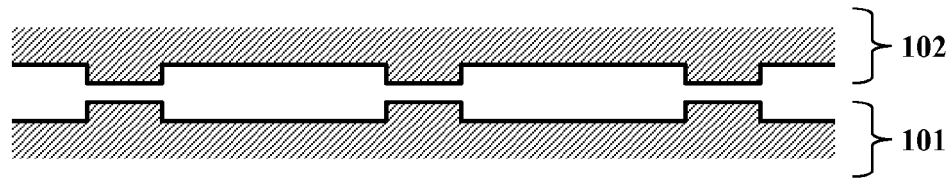

FIG. 1 represents the SGLM in its OFF state. In the ON state, illustrated in FIG. 2, one of the gratings—typically the reflection grating—is laterally translated so that the transmission and reflection grating lines overlap. In this configuration, the $\pi$ phase shift from the transmission grating lines cancels the $-\pi$ phase shift from the reflection grating lines, resulting in no cumulative phase shift and hence maximum zero-order reflectance.

Figure 3:
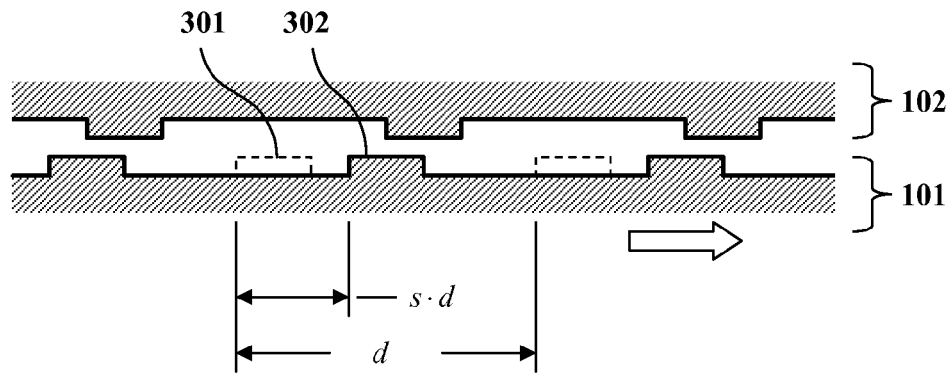

The movable grating can also be positioned in an intermediate state, with the reflection and transmission grating lines only partially overlapping, to provide continuously-variable zero-order reflectance, as illustrated in FIG. 3. The bottom grating is shifted from its centered OFF position 301 (corresponding to FIG. 1) to its intermediate position 302 by a distance s·d, where is a dimensionless shift parameter.

Figure 4:
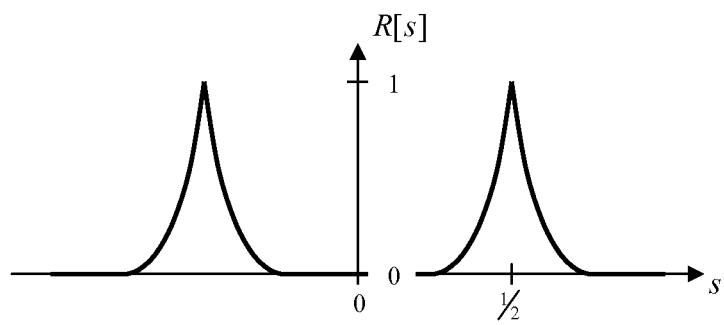
FIG. 4 shows a plot of the SGLM's zero-order reflectance as a function of lateral displacement, for the configuration illustrated in FIGS. 1-3 and based on a simplified phase-shift optical model.
Figure 5:
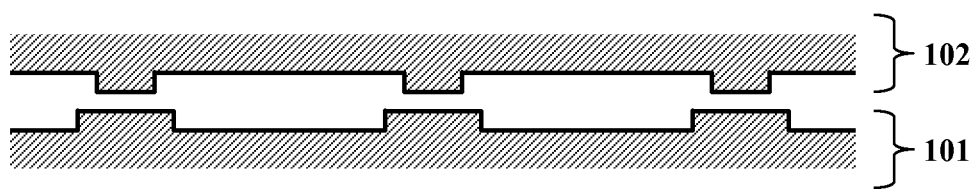
FIG. 5 illustrates an SLGM design modification that provides minimal sensitivity to lateral position errors in the ON state.
Figure 6:
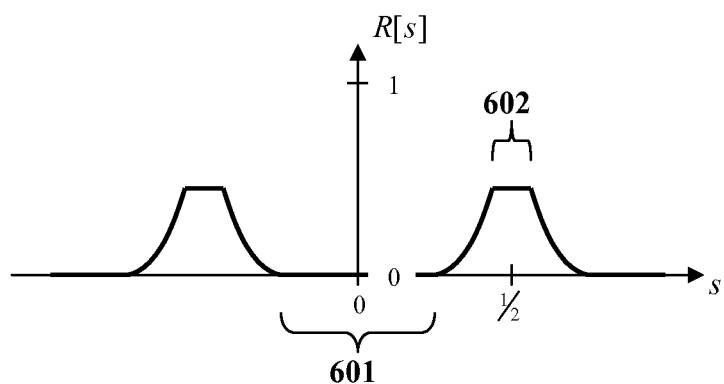
FIG. 6 illustrates the zero-order reflectance plot with the design modification of FIG. 5.

Based on the simple phase-shift model outlined above, the SGLM's zero-order reflectance R[s] (as a function of s) has the form illustrated in FIG. 4. (Note: Square braces are used throughout this disclosure to delimit function arguments, as in R[s].) The reflectance is zero over a broad range $|s| \leq \frac{1}{4}$, but it has a sharp peak at $s=\frac{1}{2}$, making the ON state sensitive to positioning errors. However, the sensitivity can be mitigated by altering the grating line widths, e.g., by increasing the reflection grating line widths and decreasing the transmission grating line widths by the same amount. This is illustrated in FIG. 5 with the SGLM in its ON state (cf. FIG. 2). In this case, the reflectance curve R[s] still has a broad zero in the OFF state. But it also has a flat top in the ON state, as illustrated in FIG. 6, making the ON state insensitive to small positioning errors. (The positioning tolerance ranges in the OFF and ON states are indicated as 601 and 602, respectively.) However, the tradeoff to this advantage is reduced zero-order reflectance in the ON state.

According to the phase-shift model, the SGLM would exhibit the same reflectance characteristics if the height levels in zones T1 and T2 were interchanged, so that T1 is a space and T2 is a line (with a double-pass phase shift of $-\pi$ in T1 relative to T2). Similarly, the model would predict the same performance if R1 and R2 were a line and a space, respectively (with R2 inducing a phase shift of $+\pi$ relative to R1).

The SGLM concept outlined above assumes an ideal AR coating on the transmission grating. As an alternative to a conventional AR coating, a surface nanostructure pattern such as a "moth-eye" structure could be used to mitigate reflections at the top surface. The system can be designed to operate without any such AR coating or mechanism, but in general the transmission and reflection gratings could comprise zones (e.g., "lines" and "spaces") with multiple-layer optical coatings. (A "line" is equivalent to a layer composed of the substrate material, and a "space" is basically an air layer, but the zones can alternatively comprise other materials. For example, the space between the gratings might be filled with an immersion fluid.) Non-lamellar grating profiles, such as sinusoidal gratings, could also be used, but lamellar structures can be more easily manufactured to stringent tolerance specifications, and can be designed to achieve a broad positioning tolerance for the ON and OFF states, as illustrated in FIGS. 5 and 6. The following discussion will be limited to gratings of lamellar form, but possibly with multiple optical layers in each zone.

2. SGLM Design Methodology

An SGLM can be designed by first employing a geometric-optics model to estimate its zero-order reflection efficiency. (This is a generalization of the above-described phase-shift model.) In this model the reflected field's complex amplitude at any point above the transmission grating is estimated by applying a thin-film optical model to the layers traversed by a ray passing through that point. Diffractive interactions with nearby grating zones having different layer structures are neglected. An areal average of the reflected beam's complex amplitude is then calculated to determine the zero order's reflection amplitude. (Mathematical details of the geometric-optics model are outlined in the Appendix.)

Within the geometric-optics approximation, the reflection amplitude in the OFF state is a linear function of the grating line widths. The requirement that the OFF-state amplitude be zero at a particular wavelength implicitly defines two equations (for the real and imaginary parts of the amplitude), which can be solved for the transmission and reflection gratings' line widths. (The achievement of a zero-amplitude OFF state does not generally depend on the double-pass phase shifts over the grating lines being $\pm\pi$ as in the preceding design illustration.) This condition constrains the line widths, and within this constraint other grating parameters (e.g., line heights or layer thicknesses) can be selected to achieve design objectives such as maximum ON-state efficiency or a specified ON-state positional tolerance range.

Figures 7A, 7B:
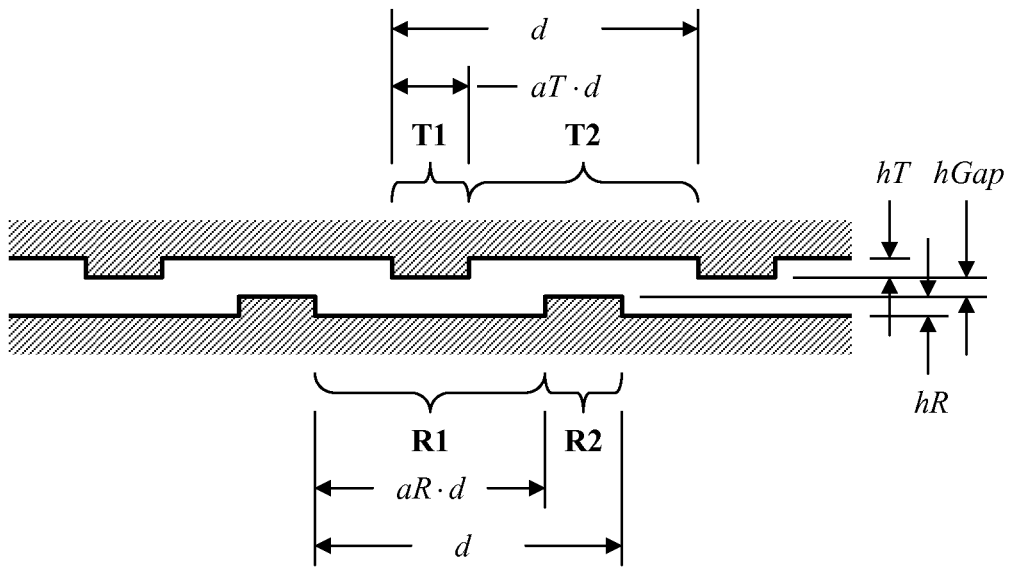
FIGS. 7A and 7B tabulate and illustrate design parameters of an SLGM in a preferred embodiment.

For example, FIG. 7A tabulates design parameters for a simple SGLM structure comprising lamellar gratings with no optical coatings, which is illustrated cross-sectionally in FIG. 7B. The transmission grating comprises zones T1 (a line) and T2 (a space), and the reflection grating comprises zones R1 (a space) and R2 (a line). In the OFF state zone R2 is positioned below zone T2, and in the ON state zone R2 is below T1.

The design is initialized by first selecting a range of possible values for the reflection grating height hR, transmission grating height hT, and clearance gap thickness hGap. According to the geometric-optics model, the SGLM reflectance R[s] has a periodic dependence on both hR and hGap, with a half-wavelength period, so it suffices to limit hR and hGap to a $\lambda/2$ sampling range. For each selected combination (hR, hT, hGap), the zone width parameters aR and aT are calculated, as outlined above, to make the OFF-state reflectance zero (R[0] =0). The configuration options are then screened to eliminate any results having calculated width parameters that are not positive and less than 1. The ON-state reflectance (R[½]) is then calculated for each remaining configuration, and the configurations are further screened to eliminate results having ON-state reflectances below a specified minimum acceptance value.

Other screening criteria may also be applied to the results. In particular, it would be desirable to select hGap so that the ON-state reflectance is at a local maximum with respect to hGap. Typically, hGap would be sampled on a uniform grid, and the screening process eliminates any configurations for which the ON-state reflectance increases when hGap is either incremented or decremented by one sampling step with all other parameters unchanged.

After applying the screening process, the remaining configurations are numerically refined to optimize performance. In this step, hR and hT are constrained to maintain zero OFF-state reflectance, and hGap is constrained to maintain the ON-state reflectance at a local maximum with respect to hGap. Within these constraints the zone width parameters aR and aT are selected to achieve a specified ON-state target reflectance and to maximize the ON-state tolerance range (602 in FIG. 6). Alternatively, the ON-state tolerance range can be constrained, and the ON-state reflectance can be maximized. After applying this numerical refinement process, the configurations are further screened to eliminate redundant configurations.

All of the above steps are performed using the geometric-optics model. The configurations must then be further refined using an accurate computational electromagnetics (CEM) simulation model. The geometric-optics model is only realistic for large grating periods (e.g., much greater than ten wavelengths), but some configurations maintain qualitatively similar reflectance curves R[s] at much smaller periods. Those that do will tend to be good candidates for further refinement with the CEM model.

According to the geometrics model, the grating performance is unchanged if either hR or hGap is incremented or decremented by $\lambda/2$, but this is not true of the CEM model. Thus, each optimized configuration from the geometrics model can determine multiple starting configurations for the CEM refinement by adding or subtracting whole multiples of $\lambda/2$ to hR or hGap.

In applying the CEM model, the OFF-state reflectance error can be quantified by the mean-square reflectance at a number of grating positions within a specified OFF-state positioning tolerance range, and with at least two hGap values within an hGap tolerance range. The ON-state reflectance error can be quantified as the mean-square reflectance error relative to either the mean ON-state reflectance or a specified minimum ON-state reflectance target—whichever is greater. The mean values are calculated over a range of grating positions within a specified ON-state positioning tolerance range, and with at least two hGap values within the hGap tolerance range. The OFF-state and ON-state reflectance errors are summed to determine a "merit function," which is minimized in the final design refinement. This is a five-parameter optimization over aR, aT, hR, hT, and hGap.

The CEM optimization is performed using a periodic-grating model, assuming uniform, collimated illumination. In a final refinement step, the design may be further optimized to take into account non-uniformity of the illuminating beam's complex amplitude across the grating aperture. This step would require a generalized CEM simulation model that applies to non-periodic grating structures and non-uniform illumination.

The final optimization will not generally be able to achieve precisely zero reflectance in the OFF state, and the reflectance in the ON state may have to be compromised to achieve other design objectives such as position insensitivity in the ON state. The design can nevertheless achieve "substantially zero" OFF-state reflectance and "high" ON-state reflectance in the sense that the OFF-state reflectance is sufficiently low, and the ON-state reflectance is sufficiently high, to provide a useful optical modulation capability.

3. Design Examples

Figures 8A, 8B:
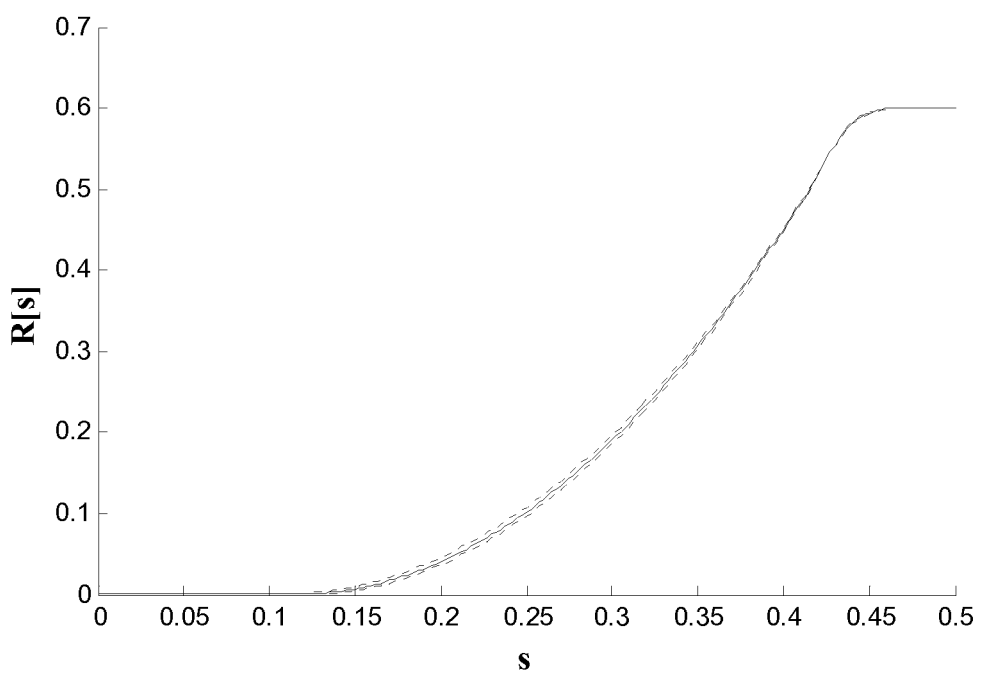
FIGS. 8A-8D tabulate numerical design data, and illustrate optical performance data, for one particular configuration of the preferred embodiment.

FIG. 8A tabulates design parameters of a particular SGLM design, which was developed using the above procedure. This design was developed using the GD-Calc® (Grating Diffraction Calculator) simulation software, including diffraction orders −50 . . . 50 in all calculations. (GD-Calc is a MAT-LAB® program available from KJ Innovation: http://software.kjinnovation.com/GD-Calc.html.) The reflective grating is aluminum (Al), and the transmission grating is silicon dioxide (SiO2). This design can be used as a starting point for developing other similar designs, e.g., by incrementally varying the wavelength, refractive indices, or grating period, and re-optimizing other parameters.

Figure 8C:
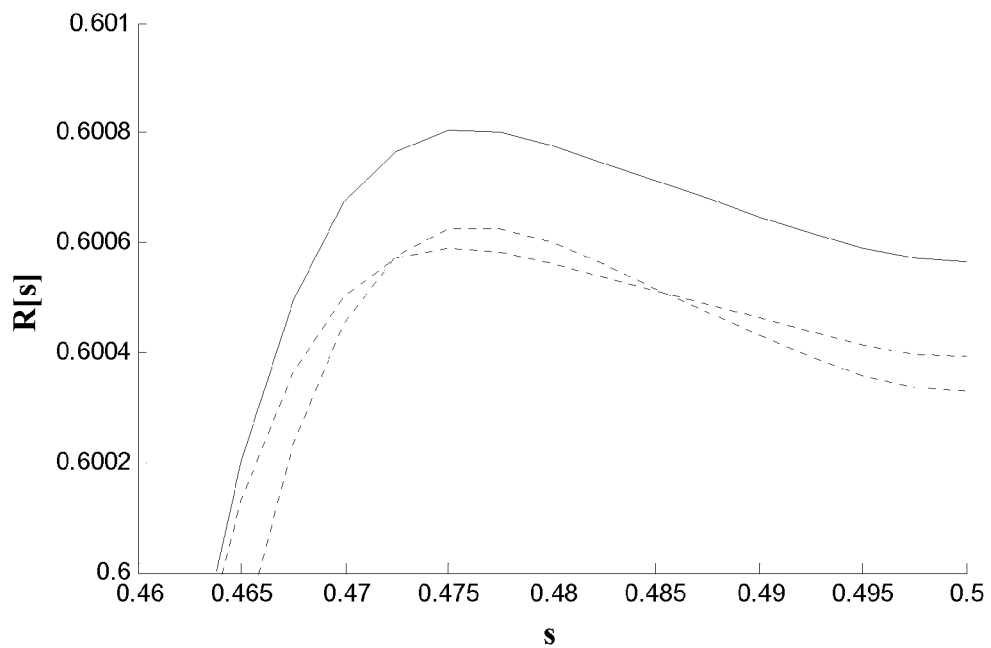
Figure 8D:
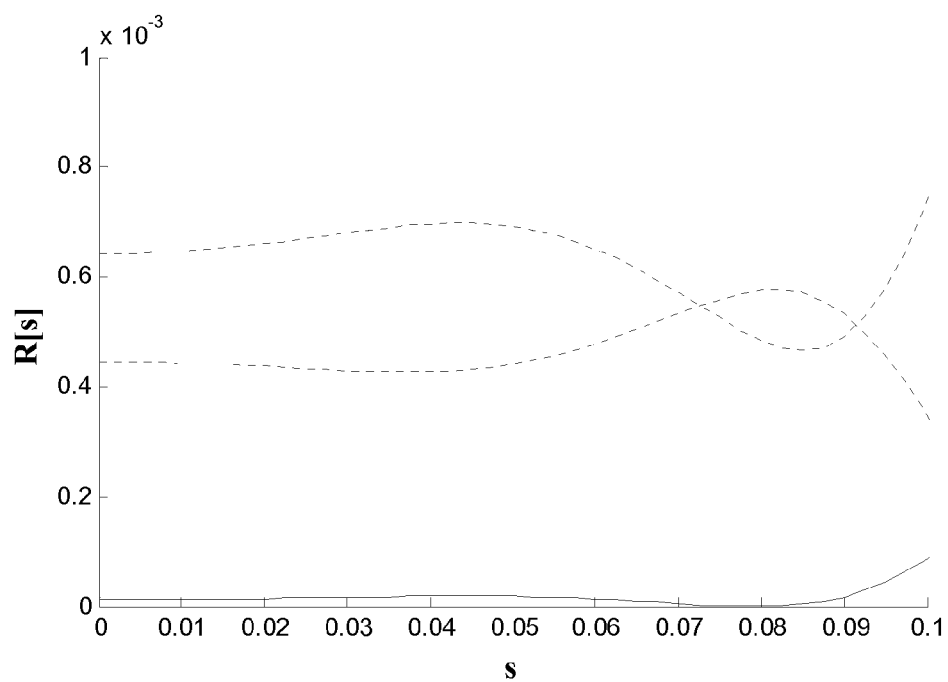

FIGS. 8B-8D illustrate the grating's calculated zero-order reflectance for normally-incident light at the design wavelength, which is linearly polarized parallel to the grating lines. (The design could be optimized for unpolarized light, but the performance would not be as good.) The solid curves in the figures illustrate R[s] with no error in hGap, and the dashed curves illustrate the effect of a ±0.005-micron change in hGap.

FIG. 8C shows detail of the ON-state reflectance, which is slightly over 60%. (The efficiency could be increased, but at the expense of a narrower positioning tolerance range in the ON state.) Without any hGap error, the reflectance is flat within 0.02% over the range 0.47≤s≤0.53 (which corresponds to a 0.48-micron positional range). With a ±0.005-micron tolerance range in hGap the reflectance variation over this range increases to 0.05%.

FIG. 8D shows detail of the OFF-state reflectance. (The vertical scale ranges from zero to 0.1%.) Without any hGap error, the reflectance is below 0.002% over the range −0.09≤s≤0.09 (corresponding to a 1.44-micron positional range). With a ±0.005-micron tolerance range in hGap the reflectance over this range increases to about 0.06%. The OFF-state reflectance is approximately quadratic in the hGap error (e.g., reducing the error by a factor of 2 would reduce the OFF-state reflectance about a factor of 4).

The grating period can be significantly reduced, and the device can be optimized to achieve higher efficiency, but the resulting design would be much less tolerant of positioning errors. For example, FIG. 9A tabulates parameters of a design that is very similar to FIG. 8A, except that the period is reduced to 1 micron. Also, hGap is increased by approximately a half wavelength in order to maintain an adequate grating clearance.

Figures 9A, 9B:
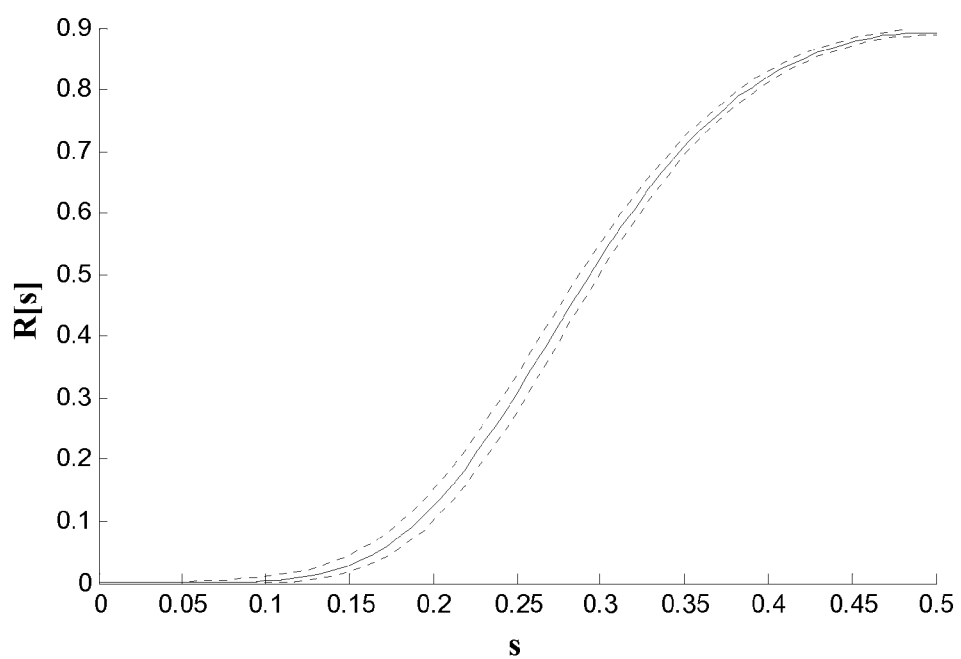
FIGS. 9A-9D tabulate numerical design data, and illustrate optical performance data, for another configuration of the preferred embodiment.
Figure 9C:
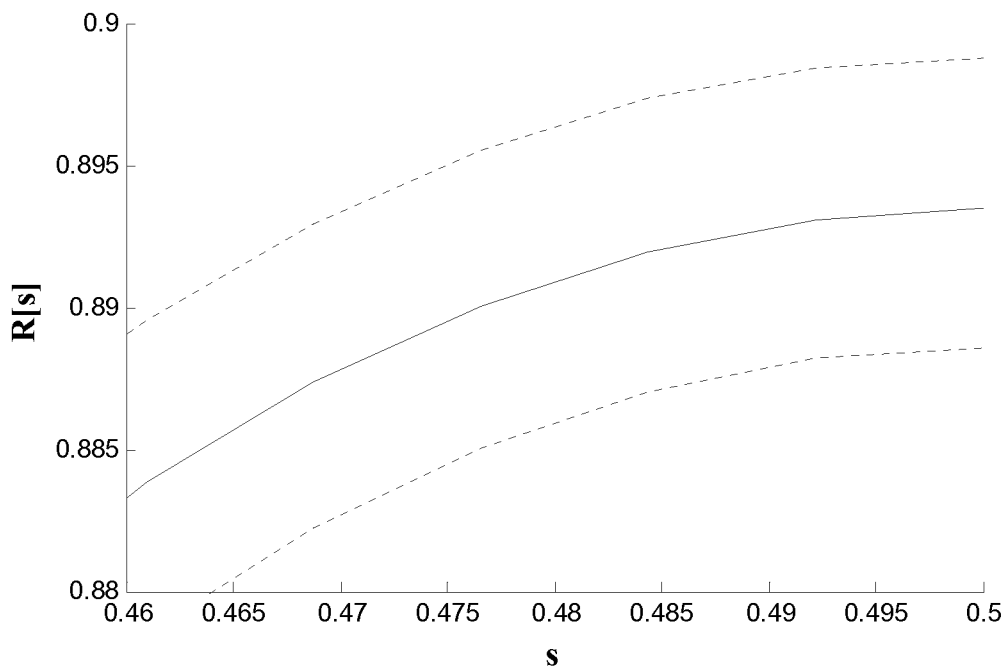
Figure 9D:
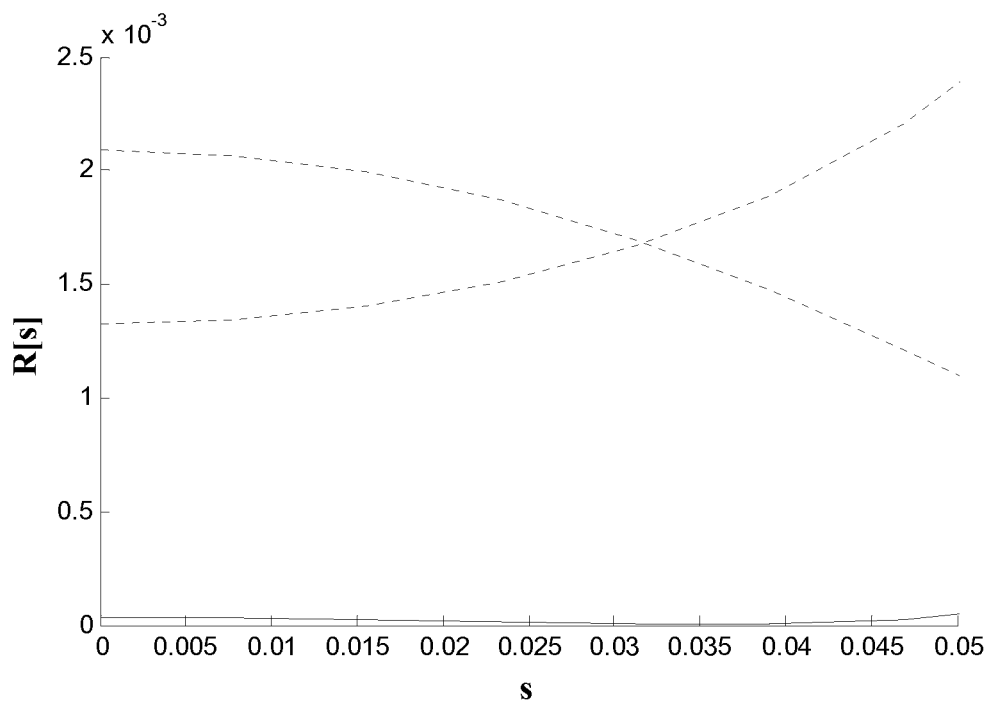

Reflectance plots for this grating are shown in FIGS. 9B-9D (again for polarization parallel to the grating lines). The peak reflectance is 89%, nearly as high as bare aluminum (92%). As shown in FIG. 9C, the ON-state reflectance, with no hGap error, varies by 0.6% over the range 0.47≤s≤0.53 (a 0.06-micron positional range); but a ±0.005-micron hGap tolerance range (dashed curves) increases this variation to 1.6%. As shown in FIG. 9D, the OFF-state reflectance, with no hGap error, is below 0.005% over the range −0.05≤s≤0.05 (a 0.1-micron positional range); but a ±0.005-micron hGap tolerance range increases this variation to about 0.2%. (The hGap sensitivity of these designs could be mitigated by employing an AR coating or mechanism such as a moth-eye surface structure on the transmission grating.)

4. Bigrating Designs

SGLM designs employing line gratings such as those described above can be optimized for unpolarized light, but performance would be compromised. If the SGLM is intended to operate with unpolarized light, or if the device should not significantly affect the beam's polarization in the ON state, then a "bigrating" (biperiodic grating) design can be employed. (The geometric-optics model in the Appendix applies primarily to line gratings but can be adapted for bigratings.)

Figure 10A:
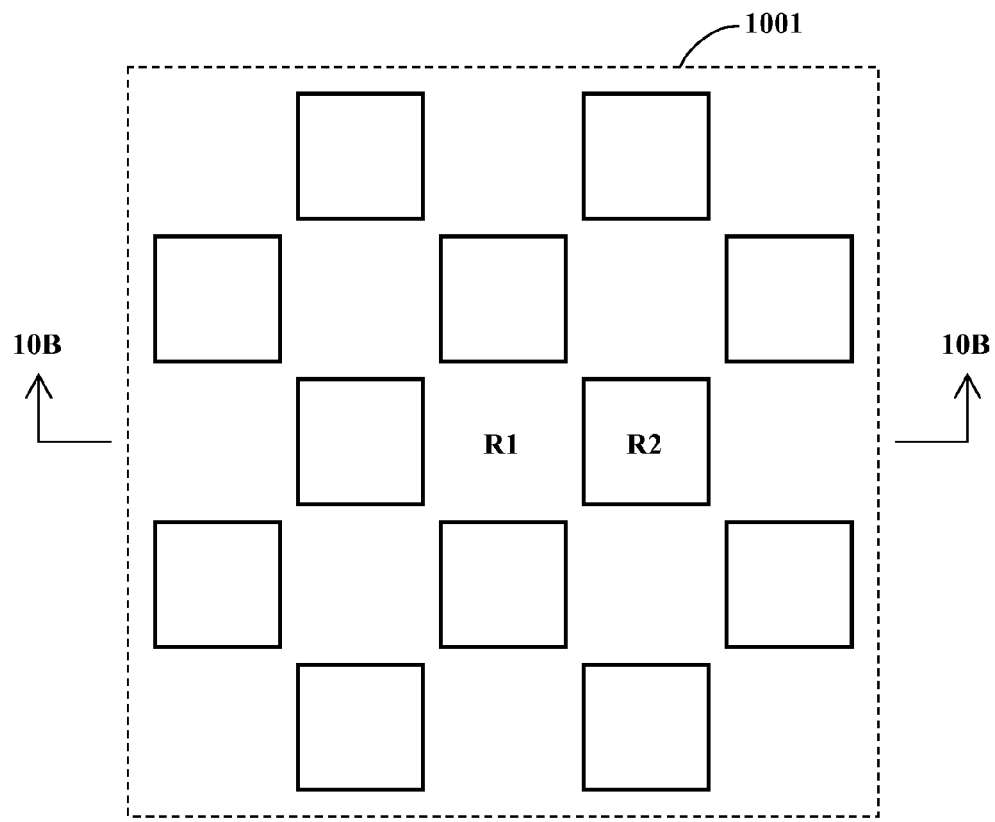
FIGS. 10A and 10B show plan and sectional views of the bottom (reflection) grating in a second SGLM embodiment, which is configured to operate with unpolarized light or to be polarization-insensitive.
Figure 10B:
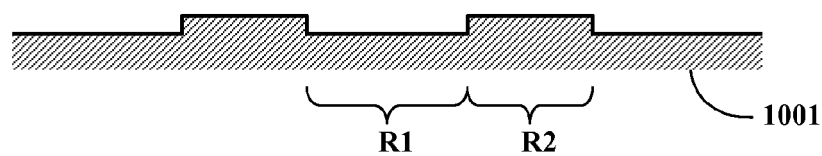
Figure 11A:
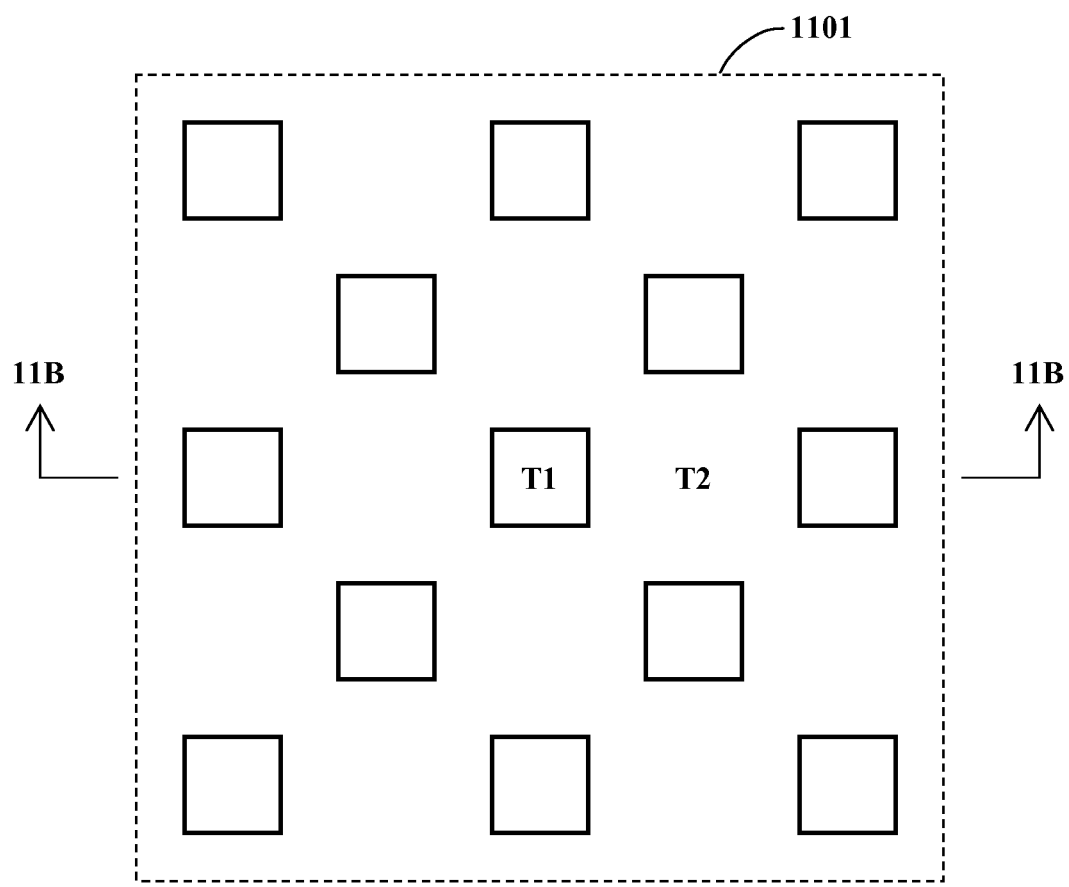
FIGS. 11A and 11B show plan and sectional view of the top (transmission) grating in the second SGLM embodiment.
Figure 11B:
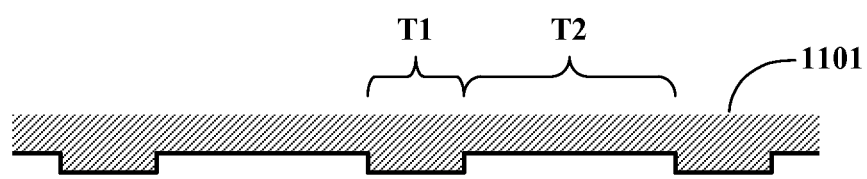
Figure 12:
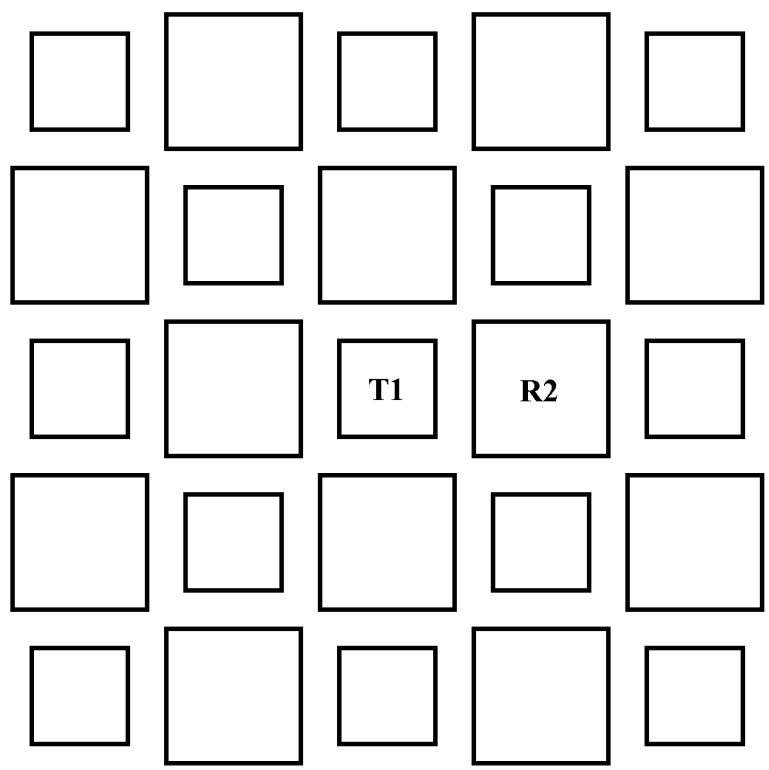
FIG. 12 shows a plan view of the second SGLM embodiment, illustrating the alignment of the two gratings in the OFF state.
Figure 13:
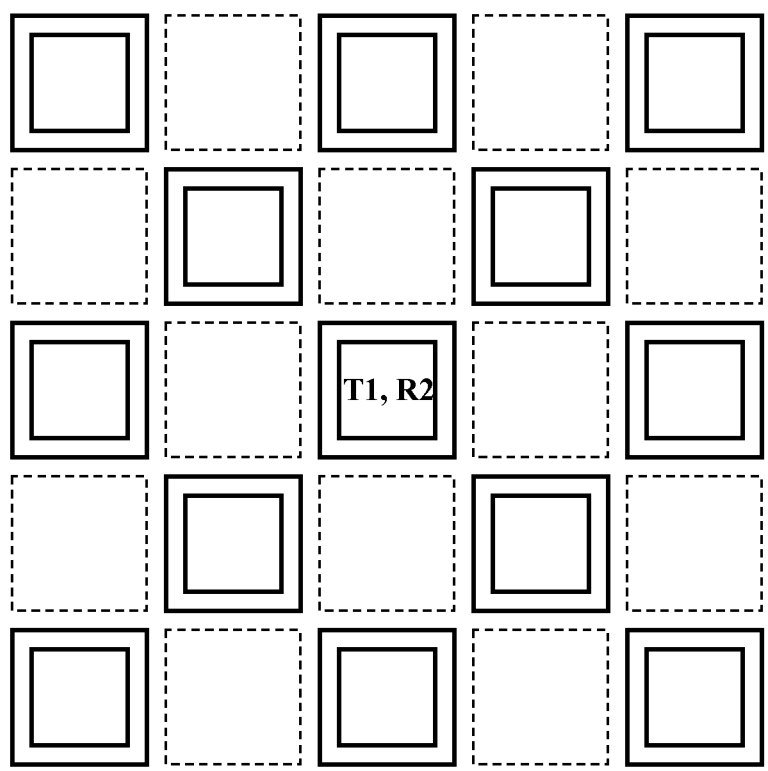
FIG. 13 shows a plan view of the second SGLM embodiment, illustrating the alignment of the two gratings in the ON state.

FIGS. 10A-13 conceptually illustrate one particular type of bigrating design. FIG. 10A shows a plan view, and FIG. 10B shows a cross-sectional view, of a biperiodic reflection grating 1001, which performs the same function as the line grating 101 in FIG. 1. In this design, the grating zones R2 are square mesas centered on a square diagonal grid, and the spaces between the mesas define zone R1. A transmission grating 1101, shown in plan view in FIG. 11A and in cross-section in FIG. 11B, similarly comprises zones T1 in the form of square mesas and zone T2 between the mesas, and it performs the same function as element 102 in FIG. 1. (Alternative designs could use recessed wells instead of mesas.) In the SGLM's OFF state, the reflection grating is positioned below the transmission grating with no overlap between zones T1 and R2, as shown in the plan view of FIG. 12. In the ON state the reflection grating (or the transmission grating) is moved laterally so that zones R2 are positioned below zones T1, as shown in FIG. 13. In these illustrations the R2 zones are slightly oversized relative to the T1 zones to accommodate an ON-state positional tolerance range, in the manner illustrated in FIGS. 5 and 6. The dashed lines in FIG. 13 illustrate the R2 zones' OFF-state positions, as in FIG. 12.

The SGLM's OFF-state configuration illustrated in FIG. 12 exhibits square symmetry, so the zero-order reflectance will be polarization-independent. It suffices to optimize the device for zero or minimal OFF-state reflectance with any particular polarization state. It will, by symmetry, automatically exhibit the same performance for any other polarization state in the FIG. 12 positioning configuration.

The ON-state configuration illustrated in FIG. 13 similarly exhibits square symmetry, so in this configuration the device performance will also be polarization-independent and the SGLM will not affect the beam's polarization state. At intermediate positions between the centered OFF and ON configurations of FIGS. 12 and 13, the device performance will not be entirely polarization-independent, but may be significantly less polarization-dependent than a line grating.

Figure 14:
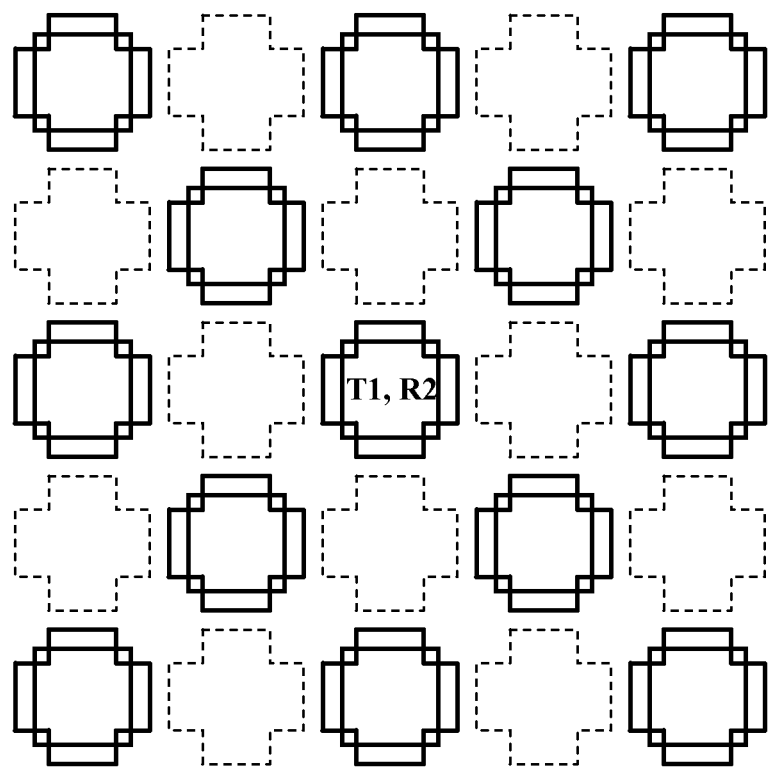
FIGS. 14-16 show variants of the second SGLM embodiment in which the grating elements have alternative shapes and layout patterns.
Figure 15:
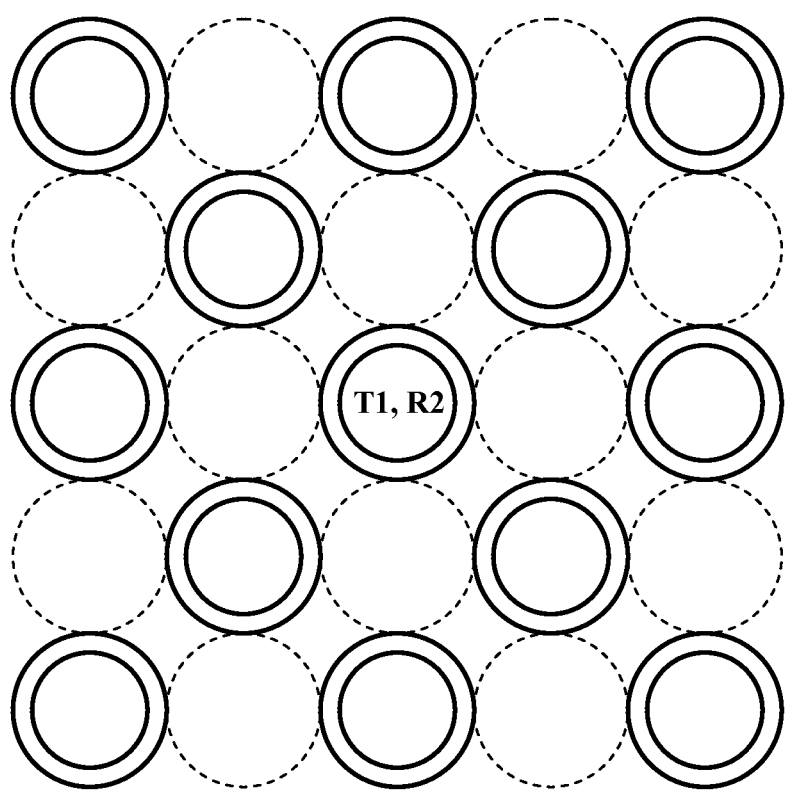
Figure 16:
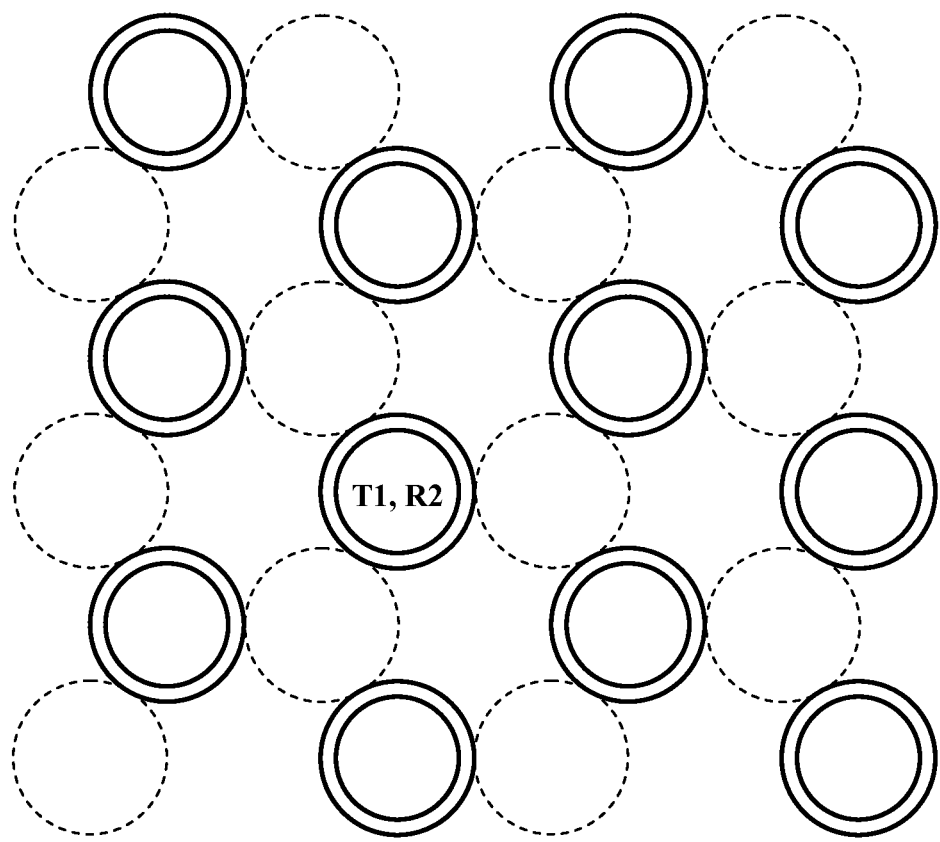

Other zone shapes are also possible. For example, FIG. 14 illustrates an SGLM configuration similar to FIG. 13, but using cross-shaped R2 regions. FIG. 15 illustrates a similar configuration in which the T1 and R2 zones are circular. FIG. 16 illustrates another configuration that also uses circular zones, but the T1 and R2 zones are centered on an equilateral triangular grid. In the OFF state the R2 zones (dashed lines) are centered symmetrically between adjacent T1 zones. For each of these alternative configurations, the reflectance in the ON and OFF states would be insensitive to small positioning errors (according to the geometric-optics model), and the symmetry would ensure polarization insensitivity in the centered OFF and ON positions.

5. System Design

Figure 17:
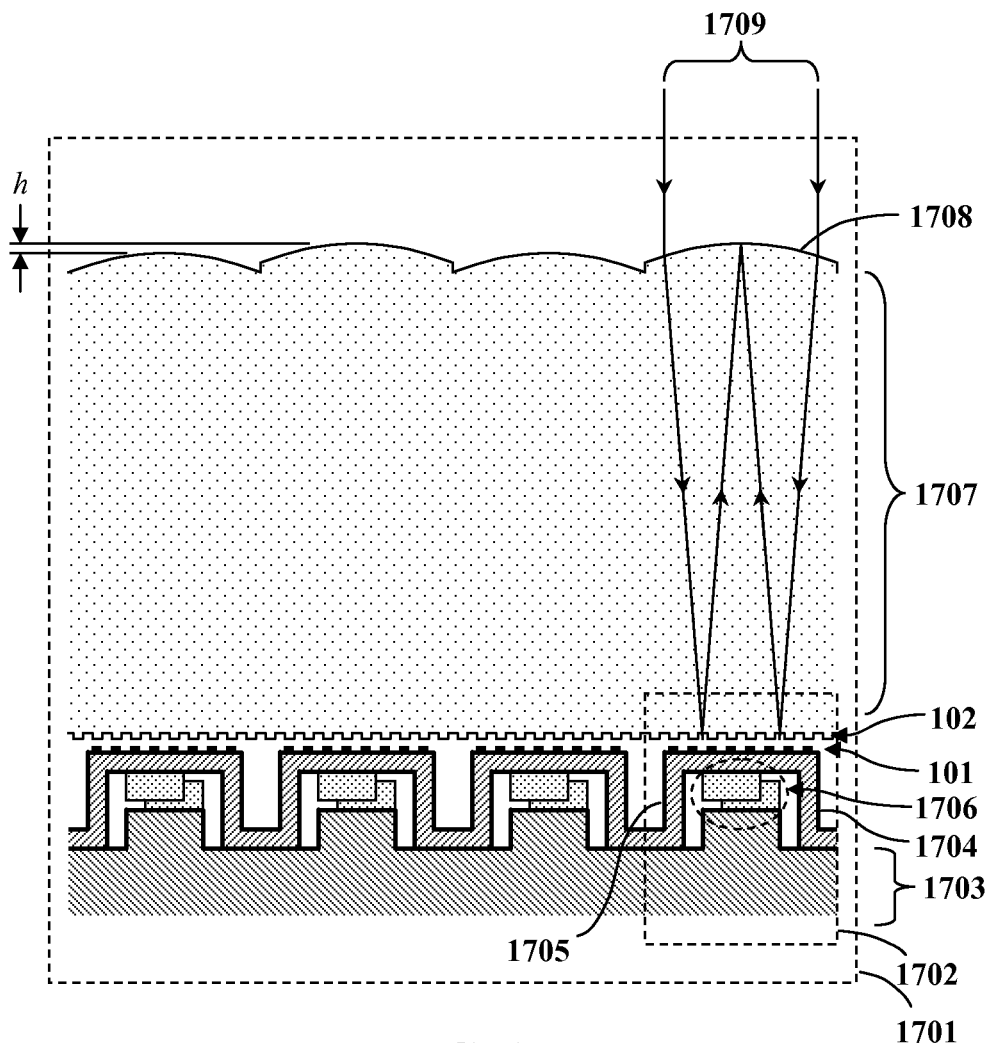
FIGS. 17 and 18 illustrate SGLM system design concepts including the grating elements, actuators, and associated microlens elements.

An SGLM would typically comprise an array of pixel elements (e.g., a megapixel square array), each of which would use two proximate gratings to modulate reflected illumination in the manner described in the preceding sections. Mechanical actuator means would preferably be located below the reflection grating, and the transmission grating would preferably be formed on a rigid cover plate, which has a microlens array on the top surface to optimize the optical fill factor. FIG. 17 shows a cross-sectional view of part of an SGLM array 1701 comprising pixel elements such as pixel 1702. The pixel comprises reflection grating 101, which is connected to a substrate 1703 through flexure elements 1704 and 1705. The reflector's lateral position is controlled by means of a backside actuator 1706 such as an electrostatic comb drive. The pixel also comprises transmission grating 102 formed on a cover plate 1707. A microlens 1708 on the cover plate's top side focuses collimated incident illumination 1709 to reduce the illuminated area on the gratings. The distance from the lens to the gratings is preferably half the lens focal length, so the zero-order reflected beam is brought to a focus in the lens aperture. However, the focal length could be sufficiently long that the diffraction-limited focused spot fills a significant portion of the lens aperture. (In practice, the grating elements 101 and 102 may need to be slightly non-uniform across the illuminated area, or slightly non-periodic, to compensate for the beam convergence.)

Figure 18:
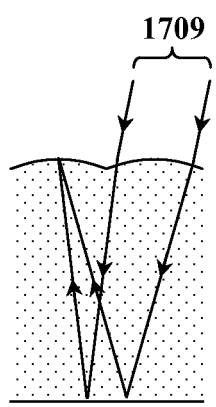

The illumination beam on each pixel need not enter and exit the system through the same microlens element. It could be directed onto the gratings at a slightly off-normal angle so that it enters one lens and exits through another adjacent lens (FIG. 18), allowing the incident and reflected beams to be separated without using a beam splitter.

Alternatively, the lens array in FIG. 17 can be configured to operate as a diffractive beam splitter, which separates the reflected beam from the incident beam. When the SGLM pixels are all in their ON state, the lens array acts as a long-period diffraction grating whose upward-directed zero order retraces the incident beam's optical path. However, small height differences in the lenses, such as step height h in FIG. 17, can induce phase shifts that extinguish the zero order, thereby separating the reflected beam from the incident beam. The reflected energy would be concentrated in the lens array's first and higher diffraction orders, which would deviate slightly from the incident beam direction.

Figure 19:
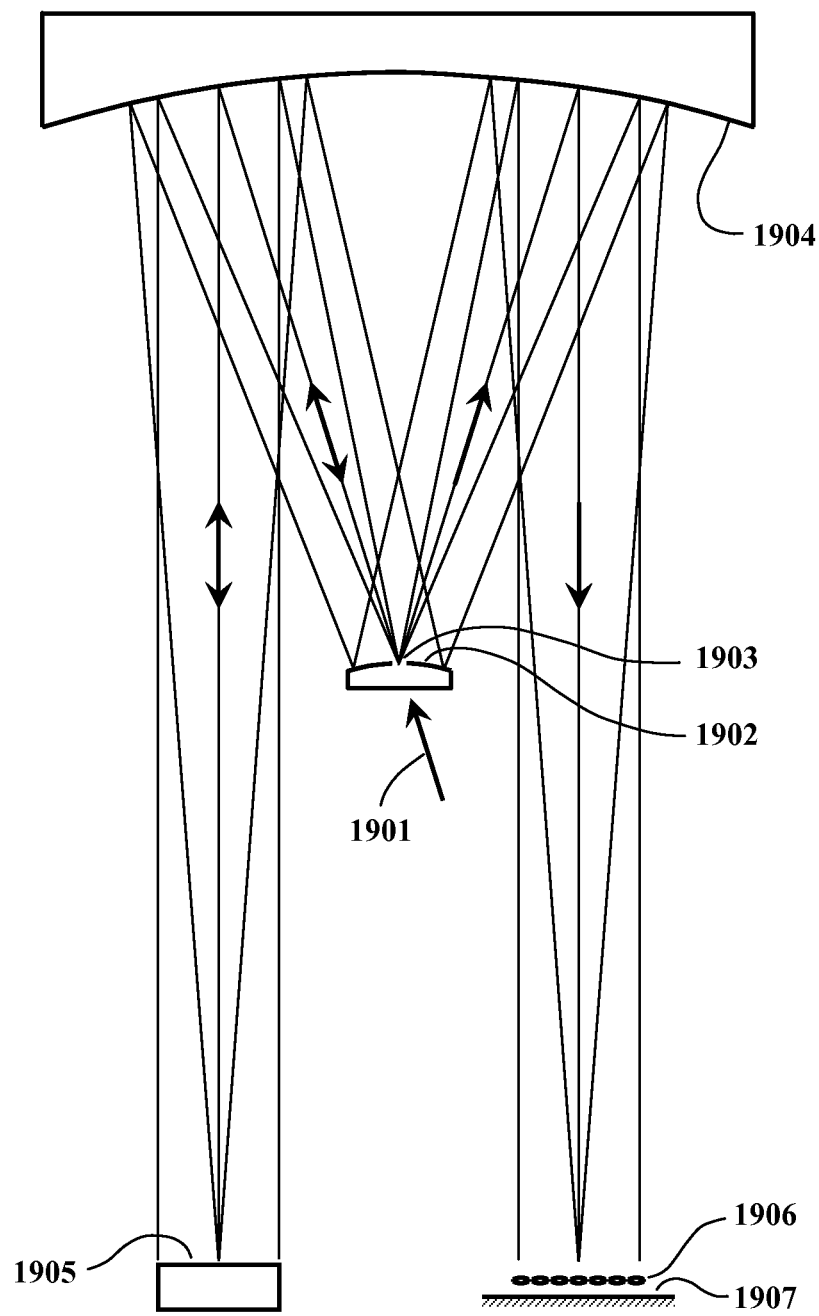
FIG. 19 illustrates a lithography or printing system employing the SGLM device of FIG. 17.

This type of system can be used for lithography or printing in the context of an "Offner Catoptric System," which is described in U.S. Pat. No. 6,489,984 and is illustrated in FIG. 19. (See FIG. 11 in '984.) Monochromatic illumination 1901 is focused toward the back side of a curved mirror 1902, and through a small spatial filter aperture 1903 in the mirror. It reflects off of a second mirror 1904, which collimates the beam, and is directed onto an SGLM 1905 such as that illustrated in FIG. 17. The SGLM's pixels that are in their ON state reflect the radiation back along the same path toward mirror 1904 and then onto mirror 1902. Mirror 1902 then reflects the beam back toward mirror 1904, which again collimates it and directs it through a microlens array 1906 and onto a printing surface 1907. Each SGLM microlens (e.g., element 1708 in FIG. 17) is imaged onto a corresponding element of microlens array 1906, which condenses the modulated light from the corresponding SGLM pixel onto a small focal spot on the printing surface. The surface is raster-scanned as the spots are modulated to build up a high-resolution, synthesized exposure image.

After the illumination is reflected from the SGLM back onto mirror 1902, the point-spread function from any individual SGLM pixel would substantially fill the mirror 1902 aperture, and only a very small portion of the point spread would intercept the aperture 1903. But with all of the pixels in their ON state, their point-spread functions could combine coherently to produce a sharp spike at the aperture, resulting in significant light loss through the aperture. The lens height steps illustrated in FIG. 17 operate to mitigate such coherent recombination by directing the reflected radiation away from the aperture.

The '984 patent illustrates phase shift distributions that can be applied to an SLM pixel array to mitigate coherent interactions between adjacent pixels. (See FIGS. 5A and 5B in '984.)

Figure 20:
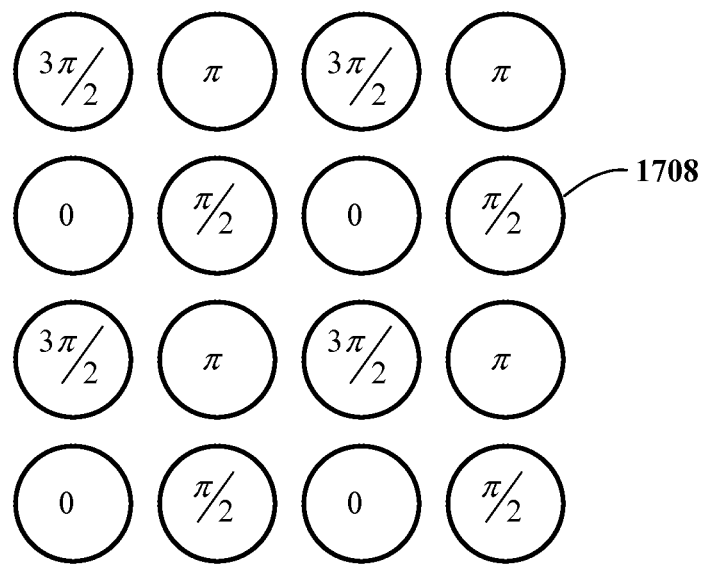
FIG. 20 illustrates a phase-shift pattern that can be applied to the microlens array in FIG. 17 to separate the reflected energy from the incident beam and to minimize coherent interactions between adjacent pixels.

An alternative phase distribution, illustrated in FIG. 20, would similarly induce phase shifts of ±π/2 (modulo 2π) between adjacent pixels to mitigate such coherent interactions. It would also operate to extinguish the lens array's zero order when the pixels are all in their ON states.

Each circle in FIG. 20 represents a microlens aperture of the SGLM (such as microlens 1708 in FIG. 17). The phase values indicated on each aperture represent the double-pass phase shift induced by the lens height steps at a particular operating wavelength λ. For example, a double-pass phase step of π/2 between two lenses implies a single-pass phase step of π/4, which would be induced by a height step of $h=\lambda/(8(n-1))$, where n is the lens refractive index. (For example, with λ=0.4 micron and n=1.558, the step height would be 0.09 micron.) The phase steps form a periodic, repeating pattern, with each 2-by-2 microlens sub-array forming a unit cell of the pattern. The phase shifts within each unit cell take on the four values 0, π/2, π, and 3π/2 in cyclic order, and the phase difference between any two adjacent lens apertures is equal to ±π/2 modulo 2π.

6. References

The following prior art and information sources are cited in the preceding specification:

U.S. Pat. No. 5,061,049
U.S. Pat. No. 5,311,360
U.S. provisional applications 60/116,074 and 60/124,140 (cited in U.S. Pat. No. 6,498,685)
GD-Calc: http://software.kjinnovation.com/GD-Calc.html.
U.S. Pat. No. 6,489,984

Appendix. Geometric-Optics Model of the SGLM

If the SGLM's grating period is large in relation to the wavelength, then its reflectance properties can be approximated using a geometric-optics model. For normal (or near-normal) incidence, the reflected beam's complex amplitude at any point above the grating stack is estimated by applying a reflection amplitude factor associated with the optical path of a normally-incident, reflected ray through the point. The zero-order reflected beam's complex amplitude is equal to the areal average of the reflected electromagnetic field amplitude above the grating.

The complex amplitude of the reflected beam at any point within a multilayer optical stack is defined by a reflection coefficient r, for normally-incident radiation of unit amplitude at that point. The reflection coefficient in the substrate is zero. If the reflection coefficient just below a particular surface is r, then the reflection coefficient r' just above the surface is calculated as follows: First, the surface's Fresnel surface reflectance coefficient rF is calculated as in Eq. A1 in FIG. 21, where n and n' are the complex refractive indices below and above the surface, respectively. (Note: All equations referenced in this Appendix are tabulated in FIG. 21.) Then r' is defined as in Eq. A2. If the reflection coefficient just above the bottom surface of a particular homogeneous layer is r, then the coefficient r' just below the top surface is defined by Eq. A3, where n is the layer's complex refractive index, h is the layer thickness, and λ is the wavelength in vacuum. (The electromagnetic field is assumed to include an implicit time-dependent factor of $\exp[-i2\pi ct/\lambda]$, where t is time and c is the speed of light in vacuum.)

We assume that each period or unit cell of the SGLM's transmission grating has two multilayer zones denoted as T1 and T2; the reflection grating similarly has two multilayer zones R1 and R2; and the two gratings are separated by an air gap of thickness hGap (cf. FIG. 7B for a line grating, or FIGS. 10A-11B for a bigrating). A grating "space" is modeled as an air layer. The SGLM's complex reflection coefficient above regions of the gratings where T1 overlaps R1, denoted as rT1R1, is estimated by applying Eqs. A1-A3 to the cumulative optical stack including R1, the separation gap, and T1. Similar coefficients rT2R1, rT1R2, and rT2R2 are defined for all other pairs of overlapping zones.

The fractional grating area covered by the T1-R1 overlap region, as a function of the period-normalized position parameter s (FIG. 3), is denoted as fT1R1[s]. Similar area fractions fT2R1[s], fT1R2[s] and fT2R2[s] are defined for all other pairs of overlapping zones. The fractions add up to 1, Eq. A4.

The complex reflection coefficient r[s] of the zero diffraction order, as a function of s, is the areal average of the reflected beam's reflection coefficient above the transmission grating, Eq. A5. The SGLM's zero-order reflectance R[s], as a function of s, is the magnitude-squared of r[s], Eq. A6.

For the grating configuration illustrated in FIG. 7B, zone R1 is centered below zone T1 when s=0 (OFF state), and it is centered below zone T2 when s=½ (ON state). The area fractions in the OFF and ON states are specified by Eqs. A7 and A8.

Figure 22:
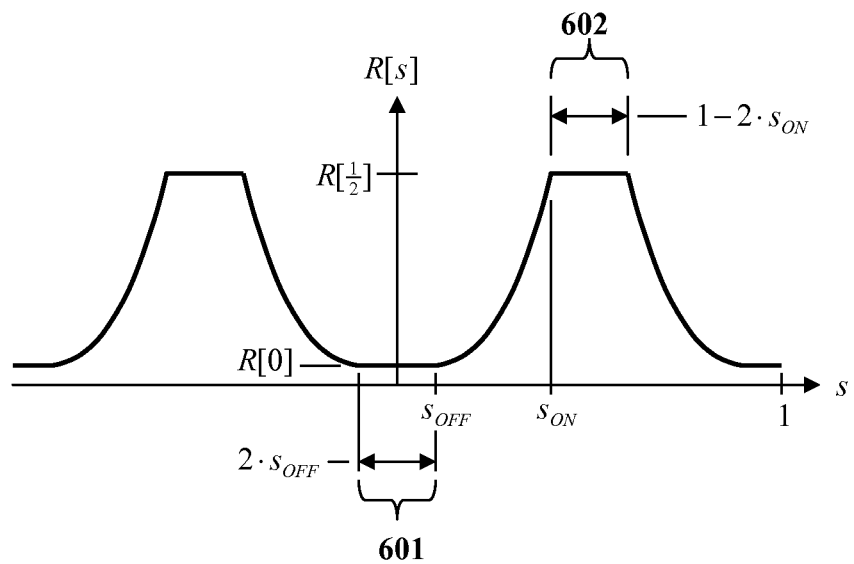
FIG. 22 illustrates parameters of the grating reflectance function, which is discussed in the Appendix.

The reflection coefficient r[s] is a modulo-1 periodic, even function of s, Eq. A9. Hence, r[s] if fully determined by it values on the interval 0≤s≤½. r[0] and r[½] are defined by equations A5, A7 and A8, and its value at intermediate positions has the form of Eq. A10, where $s_{OFF}$ and $s_{ON}$ are the positional boundaries of the flat portions of the reflectance curve (intervals 601 and 602 in FIG. 6; see also FIG. 22). These boundaries are defined by Eqs. A11 and A12.

Note that if the sign of aR−aT is predetermined, then the area fractions at s=0 (Eq. A7) are linear functions of aR and aT; see Eqs. A13 and A14. Thus, r[0] is a linear function of aR and aT (Eq. A5), and the real and imaginary parts of the equation r[0]=0 determine aR and aT. Alternatively, if aR and aT are predetermined, then the condition r[0]=0 can be used to numerically solve for two other parameters such as the grating heights hR and hT in FIG. 7A.

The geometric-optics model can be adapted to work for bigratings (FIGS. 10A-16). (Eq. A5 applies to bigratings, but the area fractions would have a different functional dependence on grating position.) Also, the geometric-optics model can be generalized in an obvious manner to the case where either of the gratings has more than two multilayer zones.

While the above is a complete description of specific embodiments of the invention, the above description should not be taken as limiting the scope of the invention as defined by the claims.

What is claimed is:

1. An optical modulator comprising:
a reflection grating,
a transmission grating in close parallel proximity to the reflection grating, and
mechanical actuation means for varying the relative lateral position of the gratings, wherein
illuminating radiation is transmitted through the transmission grating and is reflected by the reflection grating back through the transmission grating to produce a reflected beam, and
the gratings operate conjunctively to modulate the reflected beam amplitude by generating a zero diffraction order having substantially zero amplitude in a first lateral position and having high amplitude in a second lateral position.

2. The optical modulator of claim 1 wherein the gratings are configured to maintain substantially zero reflectance in the zero order over a range of lateral positions including the first position.

3. The optical modulator of claim 1 wherein the gratings are configured to maintain high and substantially constant reflectance in the zero order over a range of lateral positions including the second position.

4. The optical modulator of claim 1 wherein the gratings are lamellar gratings.

5. The optical modulator of claim 1 wherein the gratings are line gratings.

6. The optical modulator of claim 1 wherein the gratings are biperiodic gratings.

7. The optical modulator of claim 1 wherein the gratings are substantially periodic or uniform, and are configured to operate with illumination having a substantially uniform complex amplitude distribution across the gratings.

8. The optical modulator element of claim 1 wherein the transmission grating has an antireflection surface coating or structure.

\* \* \* \* \*